3,011,636
SEPARATING DEVICE AND METHOD
Harry Lyttelton Dowsett, Harold Lloyd Jefferies, and Arthur Leslie Ruckley, Tallington, Stamford, England, and Norman Leonard Samways, Pittsburgh, Pa., assignors to Dowsett Holdings Limited, London, England, a British company
Filed Apr. 1, 1958, Ser. No. 725,694
Claims priority, application Great Britain Apr. 2, 1957
12 Claims. (Cl. 209—156)

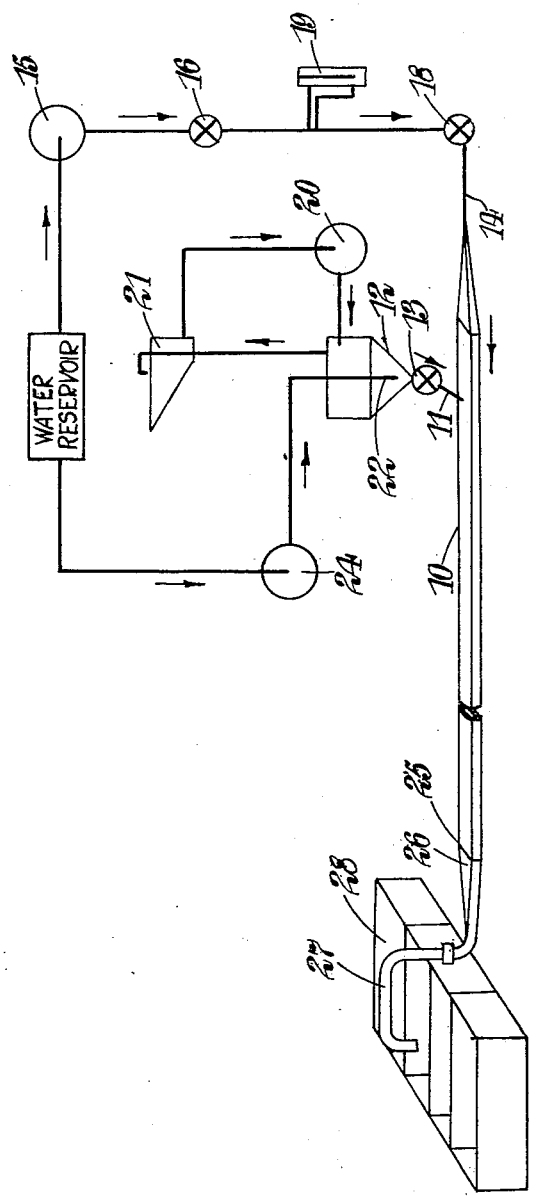

The invention relates to a method and apparatus for separating from a mixture of mineral particles, particles of different specific gravities.

The invention has many applications but is particularly suited to the separation of rutile, zircon, ilmenite, monazite and the like from the quartz of beach sand deposits, and also the separation of cassiterite, gold (specific gravity 19.3) and the like from alluvial deposits. The invention also lends itself to use on board ship (e.g. a dredger) but is not limited to such use.

The invention provides the method of separating from a mixture of mineral particles, particles of different specific gravities which method comprises intermittently feeding the mixture into a pipe, or other circumferentially closed conduit, extending horizontally or at a small angle to the horizontal, effecting full volume flow of water or other flushing liquid through the conduit at such a velocity as to cause the lighter particles to be carried along in the liquid ahead of the heavier particles, and liquid which issues from the conduit.

Conveniently to effect the distribution of the mixture it is fed into the conduit as a pulp or slurry in water, or other liquid, and it may be allowed to settle before effecting flow of the flushing liquid or it may be injected at intervals into a continuously flowing flushing liquid.

The mixture may be distributed along a considerable length of the conduit or over a small part (e.g. about 2 feet long) of the length of the conduit adjacent one end thereof, the flushing liquid being caused to flow in the direction from that end. In practice the mixture will usually be fed into the conduit through an inlet at or adjacent one end and the flushing liquid will be admitted at or adjacent the same end of the conduit.

The flow of flushing liquid may be effected at a constant velocity or the velocity may vary, for example, it may pulsate or it may progressively increase. A pulsating flow may be between off and the velocity aforesaid and be employed with the object of effecting disturbance of the particles.

Normally the length of conduit and separating conditions are arranged so that only two cuts are taken from the issuing liquid, one a lean cut and the second a rich cut. In one form of the invention separation is effected in two stages, each as described above. Two cuts are taken in the first stage and the lean cut is rejected. The rich cut is subjected to the second stage and a lean cut from this stage is re-circulated for re-treatment in the first stage. Alternatively three cuts may be taken from the issuing liquid, one a lean cut which is immediately rejected as a tailing, one a middling cut having about the same mineral composition as the original mixture and suitable for re-circulation, and the third a rich cut.

Usually the steps of the method will be repeated to constitute a continuously operated cyclic process.

The invention also provides apparatus for separating, from a mixture of mineral particles, particles of different specific gravities, which apparatus comprises a pipe, or like conduit which is circumferentially closed, which extends horizontally or at a small angle to the horizontal, means for intermittently feeding the mixture into the conduit, means for effecting full volume flow of water or other flushing liquid through the conduit at such a velocity as to cause the lighter particles to be carried along in the liquid ahead of the heavier particles, and means for taking two or more successive cuts from the particle-bearing liquid which issues from the conduit.

The apparatus may embody several conduits connected, in parallel, to the same sources of supply of pulp or suspension and flushing liquid and having a capacity matched to that of these sources. The several conduits may be fed with pulp and with flushing liquid all at the same time or they may be arranged to operate out of phase. If the apparatus is installed on board a ship the conduits may be arranged to run wholly in one direction from the source of supply or if the sources are located near mid-ships some of the conduits can run in the forward direction and others in the aft direction therefrom, as an example half the conduits can run forward and the other half aft.

The conduit, or each conduit, will usually be of substantial length, it may be straight but to enable it to be housed in a comparatively small space (e.g. on shipboard) it may be bent or curved. For example, the conduit may be reversely bent (like a hair-pin) one or more times, or it may be bent to circular, spiral or other compact form. Provided that the operative part or parts of the conduit lie horizontally or at only a small angle to the horizontal, the limbs of a reversely bent or zig-zag conduit may lie side by side in any plane horizontal, vertical or inclined or they may lie on a curve.

The conduit may be wholly or mainly horizontal in the longitudinal direction, or it may slope upwards or downwards at an angle which preferably does not exceed 12° to the horizontal, although separation at greater angles may be possible.

Separation can be effectively achieved in round, square, rectangular, elliptical and triangular sections (base down). The degree of separation depends on the amount of material fed into the conduit, its distribution, the length and cross-sectional shape of the conduit, the degree of tilt in forward and transverse directions and the velocity of the flush water.

In all cases the suitable velocity of the flush water is such as to cause turbulent flow of the water, and will usually be somewhat above that at which turbulence begins. At low velocities in the range up to 2.0'/sec. for sections having a depth of 1 inch and above it has been found that the mineral particles are swept up into dunes which move slowly and progressively along the pipe. As the dunes progress they are turned over and separation is achieved but only very slowly, and at such velocities the process would prove costly owing to the protracted pumping necessary. In the velocity range 2.0'/sec. to 6'/sec. satisfactory separation is achieved of particles varying in specific gravity from 2.7 to 4.8, and for a given pipe or conduit section it is only necessary to determine the velocity in this range which gives best separation at lowest power cost. Naturally particles in a different specific gravity range will require a different velocity range. The velocity profile across the pipe of the liquid flowing in the pipe plays an important part in determining the optimum effect. If the velocity is too low the profile is less sharp and more water power is expended to separate a given batch of material. If the velocity is too high the profile becomes much sharper and there is a tendency for some of the heavier particles to be swept out with the lighter particles. The shape of the pipe section also has an important bearing on the velocity profile found to be most suitable for separation at lowest cost. For example, the average velocity to give best results when separating particles between a specific gravity of 2.7 and 4.8 in a 4" diameter pipe lies between 4.0' and 5.0'/sec., that in a 6¼" x 2" rectangular pipe between 3.25' and 3.5'/sec. and that in a 12½" x 1" rectangular pipe between 3.0′ and 3.25′/sec. The effect of velocities in excess of 6.0/sec. is to sweep up the whole bed of the material in the aforementioned specific gravity range without discrimination and effective separation is not achieved.

A specific example of apparatus according to the invention and of the method of use of the apparatus and some representative results will now be described, the description making reference to the accompanying drawing which shows the apparatus diagrammatically.

The apparatus comprises a separating pipe 10 which in this specific example, is about 50 feet long and rectangular in section (6¼″ x 2″ deep). The inlet end is connected by a feed pipe 11 to the base of a hopper 12. The feed pipe 11 constitutes a side inlet into the pipe 10 and has a control valve 13. At the inlet end of the pipe 10 there is a pipe connection 14 to a pump 15 for flush water. This pipe connection contains a valve 16 adjustable to control the velocity of the flush water and an on/off valve 18. A flow meter 19 is provided to measure the velocity of flow. The hopper 12 is fed with pulp by means of a pump 20 which takes its feed from a conical tank 21. In order to admit pulp of known and consistent density a lance 22 is fitted in the hopper which has its outlet end just above the injection valve 13. Water from a pump 24 is pumped down the lance to agitate the pulp above the valve in such a manner as to facilitate ease of movement through the valve and provide a pulp of consistent density. The outlet end 25 of the separating pipe is converted from a rectangular to round section by means of a special transition piece 26 and thence upwards and into the horizontal arm 27 of an outlet pipe which is pivoted so that the contents emerging from the pipeline can be directed into any one of four collection hoppers 28.

In the operation of the apparatus the pulp control valve 13 is opened to inject pulp into the pipe 10 and is closed when the pulp reaches the outlet end of the pipe, or before. After a short interval for settling, the flush valve 18 is opened to admit flush water to the pipe at a suitable velocity, controlled by valve 16 and measured by flowmeter 19, to pick up, in a preferential manner, first the light particles. Alternatively the flush water may be allowed to run continuously at suitable velocity and a definite quantity of pulp injected at intervals into the stream. The issuing water containing the particles is first directed after the pulp injection, as a lean cut, into one of the collection hoppers 28. One or more subsequent, richer, cuts are directed into the other hopper or hoppers. A second injection of pulp into the separating pipe is so timed that the heavy particles of the first charge have just cleared the pipe 10 before the first of the lighter particles of the second charge reach the outlet end of the pipe. The process is repeated so constituting a continuous cyclic process.

The following represent typical experimental results using the above apparatus on the separation of enrichment of beach sands containing varying proportions of heavy minerals (H.M.) comprising rutile, ilmenite, zircon and monazite. The sands were fed into the pipe in the form of pulp containing 15%–20% solids.

CONDITIONS

[Beach sand containing heavy minerals (H.M.) fed into first 2 ft. of a 52 ft. length of 6¼″ x 2″ rectangular separating pipe so as to fill 40% of the section. Wash water was then employed continuously at a velocity of 3.6 ft./sec. so as first to wash out the quartz and lastly the heavy mineral particles. Two cuts were taken]

TIMES

| | | | | | | |
|---|---|---|---|---|---|---|
| Tailing wash (first cut), secs | 42.5 | 41.5 | 44 | 44 | 38.5 | 31.5 |
| Concentrate wash (second cut), secs | 5.0 | 8.0 | 7 | 10 | 20.5 | 37.5 |
| Total wash, secs | 47.5 | 49.5 | 51 | 54 | 59.0 | 69.0 |

PERFORMANCE

| | | | | | | |
|---|---|---|---|---|---|---|
| H.M. in feed, percent | 2.5 | 6.0 | 11.5 | 17.2 | 42.0 | 68.8 |
| H.M. in concentrate percent | 22.0 | 22.0 | 69.0 | 81.9 | 87.0 | 83.4 |
| H.M. in tailing percent | 0.42 | 0.28 | 1.95 | 3.12 | 5.31 | 12.35 |
| Enrichment ratio | 8.8 | 3.65 | 6.0 | 4.75 | 2.06 | 1.2 |
| Recovery of H.M., percent | 88.7 | 96.3 | 85.3 | 85.2 | 93.0 | 96.3 |
| Ratio—Concentrate: tailing | 1:7 | 1:2.8 | 1:6 | 1:4.3 | 1:1.23 | 1:0.25 |
| Capacity, tons/hr | 0.25 | 0.25 | 0.25 | 0.24 | 0.23 | 0.23 |

NOTE.—In the above table, the capacity or output relates only to single operation and not to continuous cyclic operation. It also ignores the fact that greater injections of slurry can be separated. By employing both these factors increased capacity would be obtained.

The advantage of a pulsating flow as mentioned above is that it causes the mineral particles to be agitated thereby helping to free the lighter particles.

A complete apparatus may embody a multiplicity of pipes each as described above, the number being matched to the output of the hopper feed pump and the capacity of the wash pump. The pipes may be operated in cycles which are in or out of phase with respect to one another. The pipes may be fed from a common distribution system and be controlled by valves at the inlet and/or outlet ends, the valves being operated automatically on a time basis or if the operator so prefers, as a result of observation, manually.

We claim:

1. The method of separating from a mixture of mineral particles, particles of different specific gravities which method comprises intermittently feeding separate charges of the mixture into a circumferentially closed conduit extending substantially horizontally, effecting full volume flow of flushing liquid through the conduit at such a velocity as to cause the lighter particles to be carried along in the liquid ahead of the heavier particles, the velocity being greater than that at which dunes of the heavier particles form on the base of the conduit, said charges being fed at a rate such that the several charges remain separated in the conduit, and taking at least two successive cuts from each charge of mixture in the particle-bearing liquid which issues from the conduit, each cut consisting of substantially the whole of the liquid issuing for the time being from the end of the conduit and one being taken when a concentration of lighter particles arrives at that end and the other being taken when a concentration of heavier particles arrives at that end.

2. The method according to claim 1 in which the mixture is fed into the conduit as a slurry.

3. The method according to claim 1 in which the mixture is allowed to settle in the conduit before the flow of the flushing liquid is effected, the flow of flushing liquid being carried out intermittently.

4. The method according to claim 1 in which the flushing liquid flows continuously and the mixture is intermittently injected into the liquid.

5. The method according to claim 1 in which the flushing liquid is caused to flow at a substantially constant velocity.

6. The method according to claim 1 in which three successive cuts are taken from the issuing liquid, one a lean cut which is rejected, one a middling cut suitable for recirculation and the third a rich cut.

7. The method according to claim 1 applied to the separation of particles of different specific gravities within the range 2.7 to 19–3 inclusive.

8. The method according to claim 1 applied to the separation of particles of different specific gravities within the range 2.7 to 4.8, the velocity of the flushing liquid in the conduit being between 2 and 6 feet per second.

9. The method of separating from a mixture of mineral particles, particles of different specific gravities which method comprises intermittently feeding separate charges of the mixture into a circumferentially closed conduit extending substantially horizontally, effecting full volume flow of flushing liquid through the conduit at such a velocity as to cause the lighter particles to be carried along in the liquid ahead of the heavier particles, the velocity being greater than that at which dunes of the heavier particles form on the base of the conduit, said charges being fed at a rate such that the several charges remain separated in the conduit, taking three successive cuts from the particle bearing liquid which issues from the conduit and consisting of substantially the whole of the liquid for the time being issuing from the end of the conduit, the last being a rich cut, and repeating in respect of the mixture in the rich cut, the steps of feeding the mixture into a circumferentially closed conduit extending substantially horizontally, and effecting full volume flow of flushing liquid through the conduit at such a velocity as to cause the lighter particles to be carried along in the liquid ahead of the heavier particles and then taking at least two successive cuts from the particle bearing liquid which issues from the conduit, each cut consisting of substantially the whole of the liquid issuing for the time being from the end of the conduit and one being taken when a concentration of lighter particles arrives at that end and the other being taken when a concentration of heavier particles arrives at that end.

10. Apparatus for separating, from a mixture of mineral particles, particles of different specific gravities which apparatus comprises a conduit which is circumferentially closed and extends substantially horizontally, means for intermittently feeding separate charges of the mixture into the conduit, means for effecting full volume flow of flushing liquid through the conduit at such a velocity as to cause the lighter particles to be carried along in the liquid ahead of the heavier particles, means for timing the feed of said separate charges so that the charges remain separated in the conduit and means for taking at least two successive cuts from each charge of mixture in the particle bearing liquid which issues from the conduit, each cut consisting of substantially the whole of the liquid issuing for the time being from the end of the conduit and one being taken when a concentration of lighter particles arrives at that end and the other being taken when a concentration of heavier particles arrives at that end.

11. Apparatus as claimed in claim 10 in which the conduit is curved.

12. Apparatus for separating from a mixture of mineral particles, particles of different specific gravities which apparatus comprises a pipe lying substantially horizontally, a valved inlet at one end of the pipe for flushing water, a valved side inlet to the pipe adjacent to that end for a suspension of the mixture of particles to be separated, a hopper for supplying suspension to said side inlet, a supply tank and a pump for supplying suspension to said hopper, a pump for effecting flow of flushing water through the inlet to the pipe at a rate to maintain the pipe full of water and to cause the water to flow through the pipe at such a velocity as to cause the lighter particles of the suspension to be carried by the liquid along the pipe ahead of the heavier particles, at least two collection hoppers at the other end of the pipe and means for diverting the flow from that end of the pipe to each hopper in turn.

References Cited in the file of this patent

UNITED STATES PATENTS

| | | |
|---|---|---|
| 371,711 | Robinson | Oct. 18, 1887 |
| 1,811,408 | Stebbins | June 23, 1931 |
| 2,022,585 | Chance | Nov. 26, 1935 |
| 2,948,396 | Condolios | Aug. 9, 1960 |

FOREIGN PATENTS

| | | |
|---|---|---|
| 326,471 | France | Feb. 25, 1903 |
| 1,138,474 | France | Jan. 28, 1957 |